March 31, 1925.
J. C. ARMOR
1,531,828
WELDING ROD OR WIRE AND PROCESS AND APPARATUS FOR MANUFACTURING THE SAME
Filed Dec. 6, 1922     2 Sheets-Sheet 1
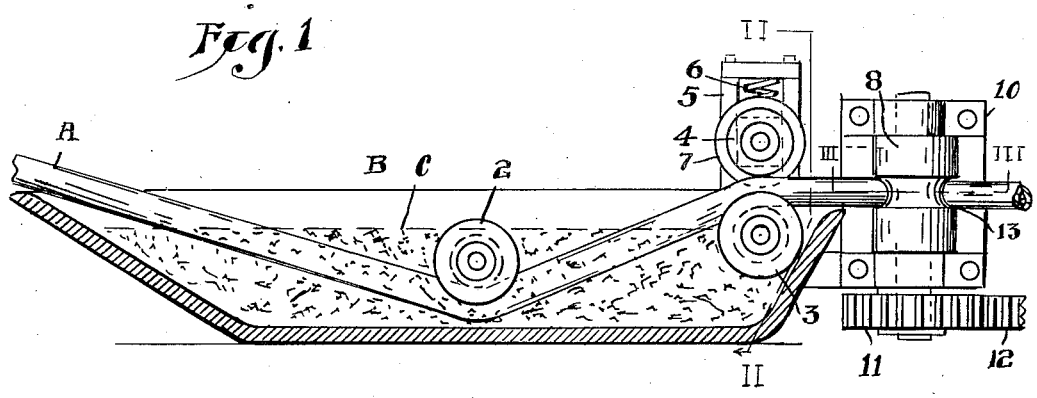
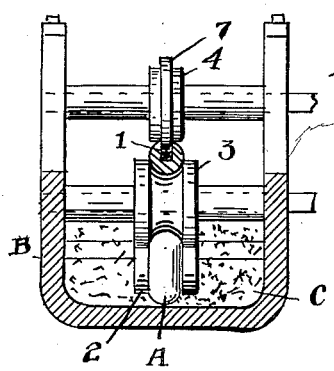
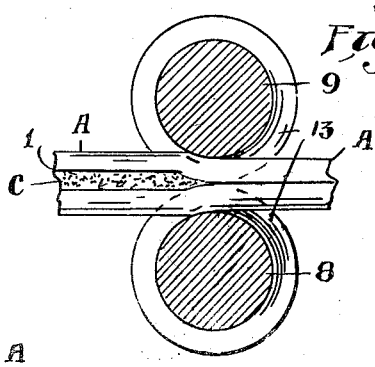
INVENTOR.
James C Armor,
BY
his ATTORNEY.
WITNESS March 31, 1925.
J. C. ARMOR
1,531,828
WELDING ROD OR WIRE AND PROCESS AND APPARATUS FOR MANUFACTURING THE SAME
Filed Dec. 6, 1922 2 Sheets-Sheet 2
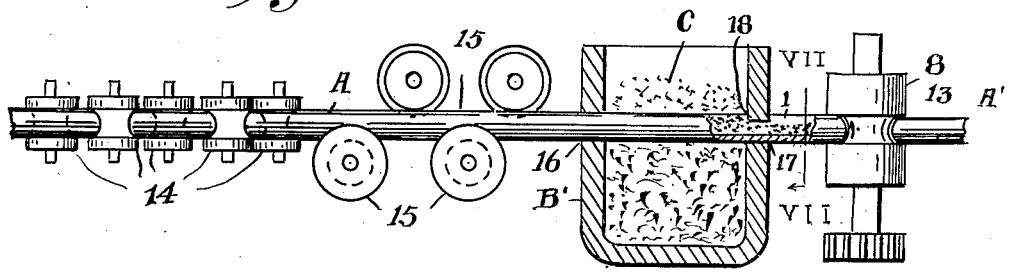
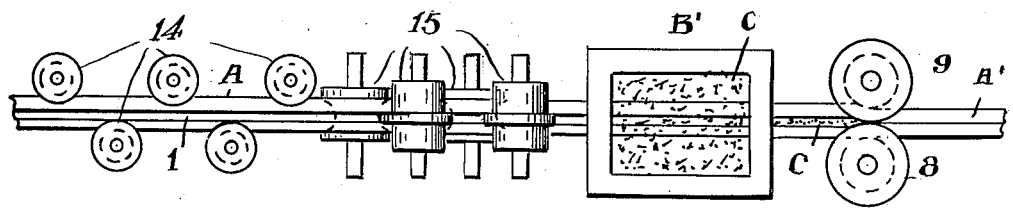
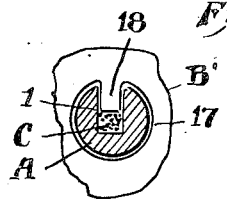
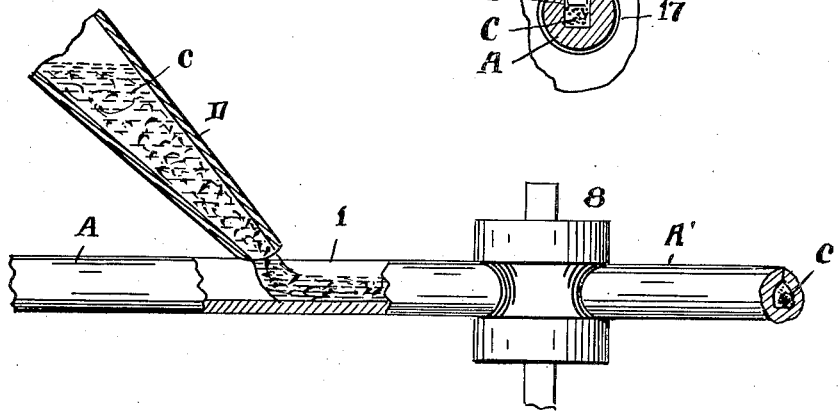
WITNESS
INVENTOR.
James C Armor
BY Edward A Lawrence
his ATTORNEYS.

Patented Mar. 31, 1925.

UNITED STATES PATENT OFFICE.

JAMES C. ARMOR, OF WEST VIEW BOROUGH, PENNSYLVANIA.

WELDING ROD OR WIRE AND PROCESS AND APPARATUS FOR MANUFACTURING THE SAME.

Application filed December 6, 1922. Serial No. 605,306.

*To all whom it may concern:*

Be it known that I, JAMES C. ARMOR, a citizen of the United States, and residing in the borough of West View, in the county of Allegheny and State of Pennsylvania, have invented or discovered the new, useful, and Improved Welding Rod or Wire, and Processes and Apparatus for Manufacturing the Same, of which the following is a specification.

My invention consists in a new and improved form of welding wire or rod for fusion welding; in a new and improved process for manufacturing the same, and in a new and improved apparatus for working said process.

In the present practice the flux, when required, is usually painted or otherwise applied as a coating to the exterior of the rod or wire. In such case, some adhesive or binding material must be used to cause the flux to adhere, which material is often detrimental to the weld. Again, the coating of flux tends to crack and flake off when the welding rod or wire is handled and manipulated. Again, it is frequently advantageous to mix with the flux other materials such as alloying, reducing or scavenging substances which are deteriorated by exposure to the atmosphere. Moreover the presence of a coating of flux and other materials impairs electrical contact with the wire.

My new and improved welding rod or wire comprises a cylinder of the welding metal in which is incased a core of suitable flux, with which flux may be mixed or associated, when required, suitable alloying, reducing or scavenging materials.

My improved process of manufacture consists in the use of a rod or wire provided, as by rolling or drawing, with a relatively deep longitudinal groove or trough, such as a wire having a substantially U-shaped cross section, introducing into such groove the flux and other materials, and then closing in the outer walls of the groove about said materials, thus producing a substantially cylindrical wall of welding metal surrounding a core of flux etc.

I show and describe practical and convenient apparatus for working my process.

In the accompanying drawings, Fig. 1 is a view partially in elevation and partially in longitudinal section, of apparatus adapted for working my process; Fig. 2 is a sectional view taken along the irregular line II—II in Fig. 1; Fig. 3 is a sectional view taken along the line III—III in Fig. 1; Fig. 4 is a broken perspective showing a portion of the wire as it is rolled to final form; Fig 5 is a view similar to Fig. 1, but showing a modified form of apparatus; Fig. 6 is a plan view of the same; Fig. 7 is an enlarged sectional view taken along the line VII—VII in Fig. 5, and Fig. 8 is a view similar to Figs. 1 and 5 but showing a third form of apparatus.

The following is a detailed description of the drawings, reference being first had to Figs. 1 to 4, inclusive.

A represents the form of rod or wire which I use, the same being substantially U-shaped, having a groove or recess 1 extending longitudinally thereof, the same being preferably of substantially rectangular form. Said groove preferably extends inwardly beyond the axis of the wire, so that when the walls of the recess are rolled or bent over together, the groove is changed into a bore substantially central of the wire. The grooved wire A is led from a suitable supply, such as a reel into an elongated container B in which is provided a supply of powdered flux C, with which flux may be mixed alloying, reducing or scavenging materials as may be required, depending upon the particular purposes for which the welding rod or wire is intended. I prefer to provide means for depressing the wire down into the container beneath the flux C, as by running the wire beneath the grooved roll 2 which straddles the groove 1. The axle of the roll 2 may be inserted in bearings in the side walls of the container B.

At the exit end of the container B, I provide a pair of horizontal rolls 3 and 4, the lower roll 3 being conveniently mounted by having its axle journaled in bearings in the side walls of the container B, while the upper roll 4 may be journaled in the stands 5 mounted on the container, the upper roll being resiliently pressed downwardly as by the springs 6.

The lower roll 3 is grooved circumferentially to pass the wire A, without compressing it, while the upper roll 4 is provided with a circumferential lip 7 of proper size to enter the groove 1 of the wire and to lightly compact the flux C therein, and to remove any excess of the same. The rolls 3 and 4 may be driven, but I prefer that they be idle. Said rolls also serve to clean the flux from the outside of the wire. The wire is led from the rolls 3 and 4 to the driven rolls 8 and 9 which are shown as vertically disposed, having their axles journaled in the housings 10, and the protruding ends of said axles provided with intermeshing gears 11. Power may be applied to said rolls in any convenient manner, as by a power driven pinion 12 meshing with one of the gears 11. The rolls 8 and 9 may be horizontally disposed, if preferred.

The rolls 8 and 9 are provided with circumferential grooves 13 of proper character to bend in and compress together the outer walls of the groove 1 of the wire A, so that the wire leaves the rolls 8 and 9 in substantially the inclosed form shown at A' in Figs. 3 and 4, the wire being substantially a cylinder of welding metal with a snugly incased central core of the flux and, if desired, alloying, reducing or scavenging materials, or any two or all of the same.

In Fig. 5 the wire A is shown running between the vertically disposed straightening rolls 14 and the horizontally disposed straightening rolls 15, and through an entrance orifice 16 in the front wall of a container B' filled with the flux C. The wire leaves the container B' through an orifice 17 in the rear wall of the container, the top wall of said orifice being preferably provided with a depending tongue 18 which extends into the upper portion of the groove 1 of the wire, compressing the flux contained in the groove and scraping off the excess of the same. The walls of the orifice 17 also clean the flux from the exterior of the wire. The wire A, loaded with flux, then passes through the groove-closing rolls 8 and 9 which reduce it to cylindrical forming, containing the core of flux In Fig. 8 I show the flux C in a plastic state extruded from a nozzle D into the groove 1 of the wire, and said groove being then closed by the rolls 8 and 9.

My improved welding rod or wire containing the flux as a central core surrounded and inclosed by a cylindrical wall of welding metal provides a greatly improved form of welding material, as the exact quantity or proportions of flux and other materials may be inclosed in the rod or wire, and none of the same is lost or impaired through abrasion or oxidation. The cost of applying the flux is also much less than where it is painted or otherwise applied as a coating to the outside of the wire. Furthermore no adhesive or binding material is used with the flux to hold the same in the wire, such materials being usually detrimental to the quality of the weld produced. The outside of the rod or wire is clean, and therefore good electrical contact may be made at any point, thus particularly adapting my rod or wire for use in automatic welding machines Again my improved welding rod or wire may be bent, manipulated, or handled in any way without danger of causing the flux to crack or flake off, as it would if applied as a paint or coating to the outside of the wire.

Where alloying materials are combined with the flux, the same are protected from atmospheric deterioration until they are melted by the electrical arc or flame.

What I desire to claim is:—

1. The process of forming a welding rod or wire which consists of taking a rod or wire of the desired welding metal and of trough-shaped cross section, with walls of substantial thickness compared to its trough, introducing into the trough a suitable flux, and then upsetting the walls of the trough so as to inclose the flux therein as a core.

2. The process of forming a welding rod or wire which consists of taking a rod or wire of the desired welding metal and of trough-shaped cross section with walls of substantial thickness compared to its trough, introducing into the trough a suitable flux, and then upsetting the walls of the trough to form a substantially cylindrical outer wall of the welding metal with an axial core of flux.

3. The process of forming a welding rod or wire which consists of forming the welding metal into a rod or wire of trough shaped cross section with walls of substantial thickness compared to its trough, introducing a flux into the trough, and then closing in the top of the trough so that an axial core of flux is surrounded by a wall of welding metal.

4. The process of forming a welding rod or wire having an inclosing outer wall of welding metal with an axial core or flux, which consists in taking a trough-shaped rod or wire of welding material, introducing a flux material into the trough, and then by pressure applied laterally to the walls of the trough closing in the same.

5. The process of forming a welding rod or wire having an inclosing outer wall of welding metal with an axial core of flux which consists in drawing an already formed trough-shaped wire or rod of the welding metal through a mass of flux material, and then closing in the walls of the trough to confine the flux material therein, substantially as described.

6. In apparatus for forming a welding wire comprised of a continuous outer wall of welding metal surrounding a core of flux, which consists in means for introducing the flux into the groove of a ready-formed rod or wire of substantially U-shaped cross section, and means for bending together the outer walls of said groove to inclose said flux as a core in the wire.

7. In apparatus for the purpose described, the combination of a container for flux, means for drawing a ready-formed rod or wire of U-shaped cross section through said container to fill the groove of said wire with flux, and means for closing together the outer walls of the groove to inclose said flux therein as a core.

8. In an apparatus for the purpose described, the combination of a container for flux, means for drawing a ready-formed rod or wire of U-shaped cross section through said container to fill the groove of said wire with flux, means for removing the excess flux from said groove, and means for closing together the outer walls of said groove to inclose said flux therein as a core.

9. In apparatus for the purpose described, the combination of a container for flux, means for drawing a ready-formed rod or wire of U-shaped cross section through said container to fill the groove of said wire with flux, means for compacting the flux in said groove and removing the excess flux, and means for closing together the outer walls of said groove to inclose said flux therein as a core.

Signed at Pittsburgh, Pa., this 2nd day of December 1922.

JAMES C. ARMOR.